United States Patent Office 2,816,134
Patented Dec. 10, 1957

2,816,134

PREPARATION OF CHLORINATED AROMATIC CARBOXYLIC ACID ESTERS

William G. Toland, San Rafael, Calif., assignor to California Research Corporation, San Francisco, Calif., a corporation of Delaware No Drawing. Application July 5, 1955, Serial No. 520,096

6 Claims. (Cl. 260—475)

The present invention relates to a process for the chlorination of aromatic carboxylic acid esters to produce the corresponding chloroalkyl ester of the aromatic acid by the direct chlorination of the alcohol portion of the ester, e. g., the formation of chloromethyl benzoate from methyl benzoate, these chloroesters being useful in the preparation of polyamides and polyesters employed in fibers, films, surface coatings, as selective chlorinating agents, and as materials from which aromatic acid chlorides can be produced by thermal rearrangement.

In my copending application Serial No. 498,116, filed March 30, 1955, there is disclosed a novel process for the preparation of acid chlorides from aromatic carboxylic esters, e. g., terephthaloyl dichloride from dimethyl terephthalate, by passing chlorine into the ester at an elevated temperature within about the range of 300° F. to 700° F.

Now in accordance with the present invention I have found that chlorinating the esters at lower temperatures, that is, at temperatures within a range having an upper limit below about 300° F., selective chlorination of the alkyl group of the alcohol portion of the ester occurs and results in high yields of the chloroalkyl ester. In general, the over-all reaction may be illustrated by the following equations indicating the reactions occurring during chlorination of methyl benzoate pursuant to the invention:

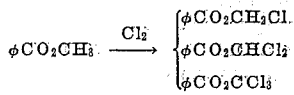

As shown, the alkyl group of the ester can be chlorinated in varying degrees depending on the amount of chlorine employed and time of reaction in accordance with regular rules of stoichiometry.

The reaction can be carried out with or without catalyst, e. g., light, and with or without solvent, e. g., carbon tetrachloride. As indicated, temperatures below about 300° F. are suitable, temperatures in the range 0–300° F. are operable and temperatures of the order of room temperature, that is, around 75° F., have been found satisfactory and are generally employed. Reaction times can vary from less than 1 hour to 3 hours, usual reaction times being of the order of 1½ hours.

A suitable aromatic carboxylic acid ester can be defined as one obtained by esterification of an aromatic carboxylic acid being free of chlorine-reactive substituent groups on the ring or aromatic nucleus, e. g., alkyl groups. The aromatic carboxylic acid moreover can contain a single aromatic nucleus or two or more fused or unfused aromatic nuclei. Examples of suitable acids are benzoic, orthophthalic, isophthalic and terephthalic acids, chlorobenzoic, naphthoic, diphenic acid, and trimesic acids.

The alcohols employed in the preparation of the ester are aliphatic, monohydric, polyhydric, primary, secondary and tertiary alcohols. Alcohols containing 1 to 8 carbon atoms are particularly preferred, with the lower molecular weight aliphatic monohydric alcohols of 1 to 3 carbons being most advantageously employed. Specific examples of suitable alcohols are methanol, ethanol, propanol, isopropanol, butanol, amyl alcohol, ethylene glycol, propylene glycol, glycerol, diethylene glycol. The aliphatic alcohols employed in the preparation of the ester may have one or more hydrogen atoms of their alkyl radicals replaced by aromatic nuclei. For example, benzyl alcohol, benzyl carbinol and the like may be employed.

The reaction is conveniently carried out in suitable apparatus such as a turbomixer, equipped with gas inlet, vapor condenser and exit lines for the withdrawal of hydrogen chloride and chlorine recovery. In carrying out the reaction the aromatic carboxylic acid ester is heated to the desired temperature and while stirring the chlorine is passed thereinto. Upon completion of the desired degree of reaction as indicated by the amount of chlorine uptake and the amount of hydrogen chloride evolution, the contents are withdrawn from the turbomixer and fractionated to recover the chlorinated ester.

The following examples are given to illustrate the practice of the invention:

*Example 1*

A vertical glass tube, fitted with a sintered glass disk at its base through which chlorine could be introduced and with a condenser at the top to permit reflux of reactants and from which off-gases could be vented was immersed in an oil bath, charged with 40.9 grams of methyl benzoate, heated up to 300° F., and chlorine introduced at a rate of 0.4 gram per minute over a period of 2.6 hours. At the end of this time, the products, weighing 46.9 grams, were removed and distilled at 3 mm. Hg, pressure. There was obtained 16.7 grams of benzoyl chloride, boiling point 70–75° C. at 3 mm., and 17.7 grams of chloromethyl benzoate, boiling point 80–83° C. at 3 mm., and 4.2 grams of more highly chlorinated products which remained as bottoms. The chloromethyl benzoate had a chlorine analysis of 21.4% (theoretical 20.8%).

*Example 2*

A small turbomixer was charged with 146.7 grams of methyl benzoate and three 100 watt light bulbs arranged uniformly around and adjacent to the liquid in the turbomixer. Agitation was begun and chlorine introduced at a rate of 1.08 grams per minute over a period of 5 hours at a temperature of 85° F. A total of 324 grams of chlorine was introduced and 117 grams recovered. Titration of the water scrubber for the exit gases showed the presence of 1.25 moles of acid, largely hydrochloric. The liquid products from the turbomixer weighed 279.6 grams. This indicates the substitution of approximately 3.85 equivalents of chlorine per mole of methyl benzoate. A sample of this product was saponified with aqueous caustic. Upon acidification of the caustic soluble products, a precipitate was formed which, when filtered, washed, and dried, was identified as chlorobenzoic acid, neutral equivalent 153.6 (theoretical 156.5). This indicated that some ring chlorination occurred during this reaction. Chlorine analysis of the crude products showed the presence of 48.27% chlorine, indicating the methyl group to have been completely chlorinated.

*Example 3*

A turbomixer was charged with 150.2 grams of ethyl benzoate and the vessel illuminated by three 100 watt light bulbs placed outside of and adjacent to the vessel walls. Chlorine was introduced at a rate of 1.1 grams per minute at 150° F. for 42 minutes with agitation. A total of 46.2 grams of chlorine was introduced and only 0.6 gram was recovered. Hydrochloric acid (0.6 mole) was also produced. The products weighed 170.4 grams, had an acid number of 477, and a chlorine analysis of 13.04%. On the basis of this chlorine analysis, the products contained 68% of monochloroester. One half of the products was distilled under 10 mm. Hg pressure, and were shown to contain 58.8 grams of unreacted ethyl benzoate and 52.3 grams of chlorinated esters.

The other half of the products were heated at atmospheric pressure in a distillation zone to convert them to the acid chloride. The following fractions were removed overhead from the distillation zone:

| Pot Temperature, °C. | Vapor Temperature, °C. | Vol., ml. | Wt., g. | Cut No. | Identity |
|---|---|---|---|---|---|
| 203 | 53 | 0 | | | Evolution of noncondensible gas, odor of acetaldehyde. Identified chloral and trichloroacetyl chloride; other compounds also present. |
| 208 | 80 | 4.0 | 3.9 | 1 | |
| 211 | 165 | 3.5 | 3.6 | 2 | |
| 212 | 197 | 3.5 | 3.6 | 3 | |
| 217 | 202 | 15.0 | 17.1 | 4 | |
| 244 | 207 | 25.0 | 27.4 | 5 | |
| 270 | 210 | 6.5 | 6.7 | 6 | |
| 320 | 233 | 6.0 | 5.5 | 7 | |
| Bottoms | | | 10.3 | | |

Cuts Nos. 4, 5 and 6 were combined, and had a chlorine content of 12.23% and a neutral equivalent of 97.0. Cut No. 7, percent chlorine 7.68, 7.74; neutral equivalent 85.2.

Analysis of the above data showed there had been produced 53.8 grams of benzoyl chloride and 0.24 mole total aldehydes by the thermal decomposition of the chlorinated products. This proves that the product of this chlorination reaction contained no chlorine on the aromatic ring but rather on the ethyl group.

*Example 4*

Isopropyl benzoate (164.2 grams) was charged to a turbomixer which was illuminated by three 100 watt light bulbs placed just outside the reactor. The temperature was raised to 150° F. and chlorine introduced at a rate of 0.4 gram per minute over a period of 2 hours. A total of 47.8 grams of chlorine was introduced and 0.6 gram recovered. A total of 0.54 mole of acid was recovered from the vent gases by the water scrubber. The products from the turbomixer weighed 180.2 grams and had an acid number of 341. On the basis of this acid number, the product contained 60.7% of monochloroester.

By a procedure similar to that used in earlier examples the products were shown to contain the following constituents:

| | Moles |
|---|---|
| Unreacted isopropyl benzoate | 0.393 |
| α-Chloroester | 0.37 |
| β-Chloroester | 0.183 |
| β-Polychloroester | 0.030 |

This accounts for 97.6% of the products.

If the crude products are heated at atmospheric pressure benzoyl chloride is produced.

*Example 5*

A turbomixer was charged with 213 grams of benzyl benzoate and the vessel illuminated externally by three 100 watt light bulbs. The temperature was increased to 220° F. and chlorine introduced at a rate of 1.1 grams per minute over a 45-minute period, during which the temperature climbed to 290° F. A total of 49 grams of chlorine was passed and 0.6 gram recovered. A total of 0.775 mole of acidity was found in the vent gases. The turbomixer products, weighing 235.6 grams, had an acid number of 371. On this basis, they contain 81.7% of chloroester, most of which was material in which the methylene group of the ester was chlorinated.

*Example 6*

A turbomixer, illuminated by three 100 watt light bulbs, was charged with 200 grams of dimethylterephthalate and the temperature raised to 260° F. and chlorine introduced at a rate of 0.95 gram per minute over a period of 1.75 hours. A total of 101 grams of chlorine was introduced and 3.1 grams recovered. The organic products weighed 245.5 grams and had an acid number of 815. This corresponds to 95.7% of monochloroester.

One half of the products was distilled at 5 mm. Hg pressure to obtain the following fractions:

| Pot Temperature, °C. | Vapor Temperature, °C. | ml. | g. | Run No. | Identity |
|---|---|---|---|---|---|
| 76 | 25 | 0 | 0 | | Some decomposition occurring in the pot. Neutral equivalent of pot products now 67.6, saponification equivalent 63.4. |
| 170 | 25 | 0 | 0 | | |
| 188 | 170 | 6.0 | 5.6 | 1 | N. E.[1]=71.1, S. E.[2]=75.3. |
| 200 | 180 | 9.0 | 12.8 | 2 | N. E.=75.6, S. E.=74.55, percent chlorine 10.4, 10.5. Distillation column removed from system. |
| 193 | 190 | 18.0 | 23.1 | 3 | N.E.=70.3, S.E.=72.3. |
| 300 | 240 | 42.5 | 56.1 | 4 | N. E.=64.0, S. E.=61.5, percent Cl=22.36, 22.49. |
| Bottoms | | | 1.8 | | |

[1] N.E.=neutral equivalent.
[2] S.E.=saponification equivalent.

From these results it was calculated that the original crude product had contained 0.266 mole of monochloroester, 0.511 mole of dichloroester, and a trace of polychloroesters. These materials can be converted by heating to the acid chloride.

Obviously many modifications and variations of the invention, as hereinbefore set forth, may be made without departing from the spirit and scope thereof and, therefore, only such limitations should be imposed as are indicated in the appended claims.

I claim:

1. Process for the preparation of a chlorinated aromatic carboxylic acid ester, which comprises contacting an aromatic carboxylic acid ester with chlorine at a temperature above about 0° F. but below about 300° F. for a period of time sufficient to chlorinate the alcohol portion of the ester.

2. Process according to claim 1 wherein the ester is derived from an alcohol having 1 to 8 carbon atoms in the molecule.

3. Process according to claim 1 wherein the ester is derived from an aromatic carboxylic acid having a single aromatic nucleus.

4. Process according to claim 3 wherein the ester is derived from an alcohol having 1 to 8 carbon atoms in the molecule.

5. Process according to claim 4 wherein the ester is derived from an alcohol of 1 to 3 carbon atoms in the molecule.

6. Process according to claim 5 wherein the ester is derived from benzene carboxylic acids.

References Cited in the file of this patent

UNITED STATES PATENTS 1,866,849  George  July 12, 1932